(12) United States Patent
Arlt et al.

(10) Patent No.: US 6,636,047 B2
(45) Date of Patent: Oct. 21, 2003

(54) METHOD AND DEVICE FOR RECOGNIZING A TRAILER OR SEMITRAILER OF A MOTOR VEHICLE

(75) Inventors: Andreas Arlt, Stuttgart (DE); Falk Hecker, Markgroeningen (DE); Herbert Schramm, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 09/851,820

(22) Filed: May 9, 2001

(65) Prior Publication Data
US 2001/0040455 A1 Nov. 15, 2001

(30) Foreign Application Priority Data

May 12, 2000 (DE) .......................................... 100 23 326

(51) Int. Cl.$^7$ ............................................... G01R 31/00
(52) U.S. Cl. ....................................... 324/504; 340/431
(58) Field of Search ................................. 303/123, 124; 324/504, 503; 340/431, 438, 518.1, 641, 642; 307/10.8

(56) References Cited

U.S. PATENT DOCUMENTS

| 3,934,940 | A | * | 1/1976 | Schnaibel | 303/123 |
| 4,430,637 | A | | 2/1984 | Ducker et al. | 340/431 |
| 4,743,888 | A | * | 5/1988 | Hilpert et al. | 340/540 |
| 5,157,376 | A | * | 10/1992 | Dietz et al. | 340/458 |
| 5,287,085 | A | * | 2/1994 | Smith | 340/438 |
| 6,075,439 | A | * | 6/2000 | Woerner et al. | 340/431 |
| 6,364,432 | B1 | * | 4/2002 | Mixon | 303/124 |
| 6,499,814 | B1 | * | 12/2002 | Mixon | 303/124 |

FOREIGN PATENT DOCUMENTS

| DE | 26 40 355 | 3/1978 |
| DE | 39 27 562 | 2/1991 |

\* cited by examiner

Primary Examiner—N. Le
Assistant Examiner—Walter Benson
(74) Attorney, Agent, or Firm—Kenyon & Kenyon

(57) ABSTRACT

A method for recognizing a trailer or semitrailer of a motor vehicle which includes activating at least one brake light of the trailer or semitrailer, independently of the driver, measuring a current flowing in a line assigned to the brake light of the trailer or semitrailer and ascertaining the presence or the absence of a trailer or semitrailer on the basis of the measured current.

18 Claims, 1 Drawing Sheet

METHOD AND DEVICE FOR RECOGNIZING A TRAILER OR SEMITRAILER OF A MOTOR VEHICLE

FIELD OF THE INVENTION

The present invention relates to a method and device for recognizing a trailer or semitrailer of a motor vehicle.

BACKGROUND INFORMATION

In the case of passenger or utility motor vehicles, for example, certain information regarding trailers or semitrailers, that may possibly be coupled to the tow car or motor vehicle, are needed for electronic stabilization programs (ESP). The essential piece of information in this case is whether or not a trailer is coupled on at all. Such information, for example, is advantageously applied also for brake control, particularly for an ABS/ASR control or a transmission control system. In ESP systems the information on whether a trailer or semitrailer is present may be used for determining a control strategy. That is, in the case where no trailer or semitrailer is present, an ordinary automatic control or regulation strategy is executed. If a trailer or semitrailer is present, then in certain driving situations, in this case, for instance, when there is danger of bending in at low speeds, a regulation strategy deviating from the usual, i.e. a modified regulation strategy is executed, with which the vehicle combination can be stabilized in this driving situation. With this strategy, the stabilizing interventions are mostly carried out in the form of braking interventions on the trailer or semitrailer. An appropriate procedure is also provided for ABS systems (regulation of brake slippage) or ASR (regulation of traction). That means, for the case where a trailer or semitrailer is coupled to the tow car, a modified regulation strategy is carried out. In this case, for example, it is all about functions for avoiding bending in, with which the rear axle of the tow car is possibly regulated to have less slippage.

Trailer recognition devices are known, in which the resistance of a brake or blinking light of the trailer is measured against ground. In doing that, however, the concerned lead to the trailer has, to be cut off, so as not to measure simultaneously the resistance of a brake or blinking light of the motor vehicle as well.

German Patent Application No. 26 40 355 describes a control arrangement for tow cars of vehicle sets, in which at least the tow car is provided with an anti-lock control system. Here, the tow car is designed with a supply line and a plug device, the plug device having a counterpart on the trailer side. A brake light installation of the trailer is connected to the counterpart of the plug. When the brake is operated, if a trailer is attached, a current flows in the brake light installation of the trailer, and at a current measuring device in the supply line a voltage is released which produces a binary switching signal. On the basis of this binary voltage signal the presence or absence of a trailer can be determined.

German Patent No. 44 17 301 describes using a locking relay in the framework of a recognition device for trailer towing. Here, the relay responds when an electric circuit is generated at the plug box leading to the trailer. In practice, preparing such a relay proves relatively costly.

Finally, German Patent No. 39 27 562 describes a device for trailer recognition in trailer trains, whose tow vehicle is fitted with an anti-lock device. This device is used to signal to the driver whether the trailer vehicle also has an anti-lock device, and whether its cable coupling has been done in orderly fashion. For this purpose, the device has an electronic, logical circuit arrangement in which at least one first and one second signal is processed. The system described in this document is considered relatively costly.

SUMMARY OF THE INVENTION

An object of the present invention is to provide recognition of a trailer of a motor vehicle that is as simple and low-cost as possible.

According to the present invention, the information as to whether a trailer is coupled to a tow vehicle or not can be prepared in simple fashion. Operating the brake light of the trailer independently of the driver, for instance, can be done using a central control device, especially a control device of an electronic braking system. To do this, no additional sensor mechanism in or at the trailer or semitrailer is required, compared to conventional systems. Furthermore, in the control device, additional electromagnetic components, for example relays, can be avoided, which, particularly with regard to their production and lifetime, can lead to problems in practice.

It is preferred that recognition of a trailer or semitrailer, according to the present invention, be carried out during the starting procedure of the motor vehicle and/or cyclically. Since the condition of trailer coupling will, as a rule, change only during stillstand, the first named measure guarantees that the desired signal will be available immediately after starting. However, for certain applications a cyclical application of the method can prove suitable.

Lighting the brake light of the trailer suitably takes place over a predetermined time interval, in particular 50 msec. By such a brief current application to the brake light it can be avoided that other traffic participants receive false information from longer current application and the resulting longer shining of the brake light, and that the other traffic participants become irritated, since the shining of the brake light is perceived only during longer current application.

It is preferred that the current measured within the framework of the method according to the present invention be compared to a threshold value, and that the determination of the presence or absence of a trailer be made on the basis of a comparison of the measured current with the threshold value. Using this measure makes available an especially simple and numerically low-effort execution of the method according to the present invention.

Expediently, a signal pointing up the presence or absence of a trailer is made available to a control device and/or to the driver of the motor vehicle. For example, such a signal, transmitted to the driver, can be provided as an optical or an acoustic signal.

DETAILED DESCRIPTION

Figure 1:
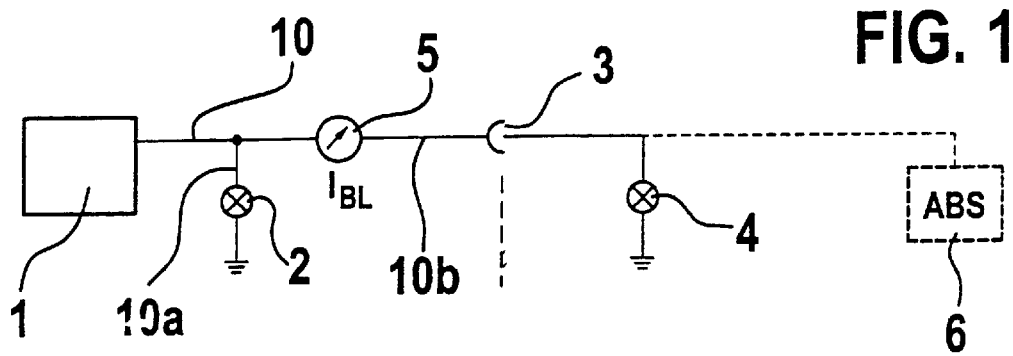
FIG. 1 shows a schematic circuit diagram illustrating the device according to the present invention.

In FIG. 1 the device for recognizing a trailer according to the present invention is represented schematically. The circuit element represented to the left of the vertically running dotted line is located on the tow car or motor vehicle; the circuit element represented to the right of the dotted line is located on a trailer. On the side of the tow car the control device of an electronic brake system is designated as 1, and the brake light of the motor vehicle is designated as 2. A trailer can be coupled electrically with a motor vehicle using an electrical connection (e.g. an electrical plug connection) illustrated schematically and denoted as 3. The electrical connection, for example, can be a 24N box.

The trailer has a brake light 4. Brake light 2 of the motor vehicle, as well as brake light 4 of the trailer are connected to control device 1 via an electric lead marked in toto as 10. In this case, brake light 2 lies on a first lead cord 10a, and brake light 4 of the trailer lies on a second lead cord 10b. The connection between lead cord 10b and brake light 4 of the trailer is interruptible by the use of the above-mentioned electrical connection. Let it be pointed out that, in the illustration of FIG. 1, for reasons of clarity, the illustration of a trailer coupling, by which the motor vehicle is mechanically coupled to the trailer, is dispensed with.

In lead cord 10b, a current measuring device 5 is provided to measure the current flowing there. In case of a connected trailer, during the operation of a brake, a current flows through lead cords 10a, 10b. The brake lights become lit. In the case where there is no trailer, i.e. where lead cord 10b essentially ends at the electrical connection, no current flows for application to brake light 4 of the trailer. A shunt resistance (resistance with a magnitude of about 1 ohm) can be installed as current measuring device 5. The current possibly flowing through such a resistor creates a voltage drop, which is then correspondingly evaluated. Alternatively to this, it is possible, using suitable measuring devices, to detect the magnetic field of the conductor having the current running through it, in order to obtain data on a flowing current, and consequently on a present trailer or semitrailer.

According to the present invention, brake light 4 can now be lit for determining the presence of a trailer in addition to its already described function, by control unit 1 and independently of brake operation, i.e. independently of the driver.

Figure 2:
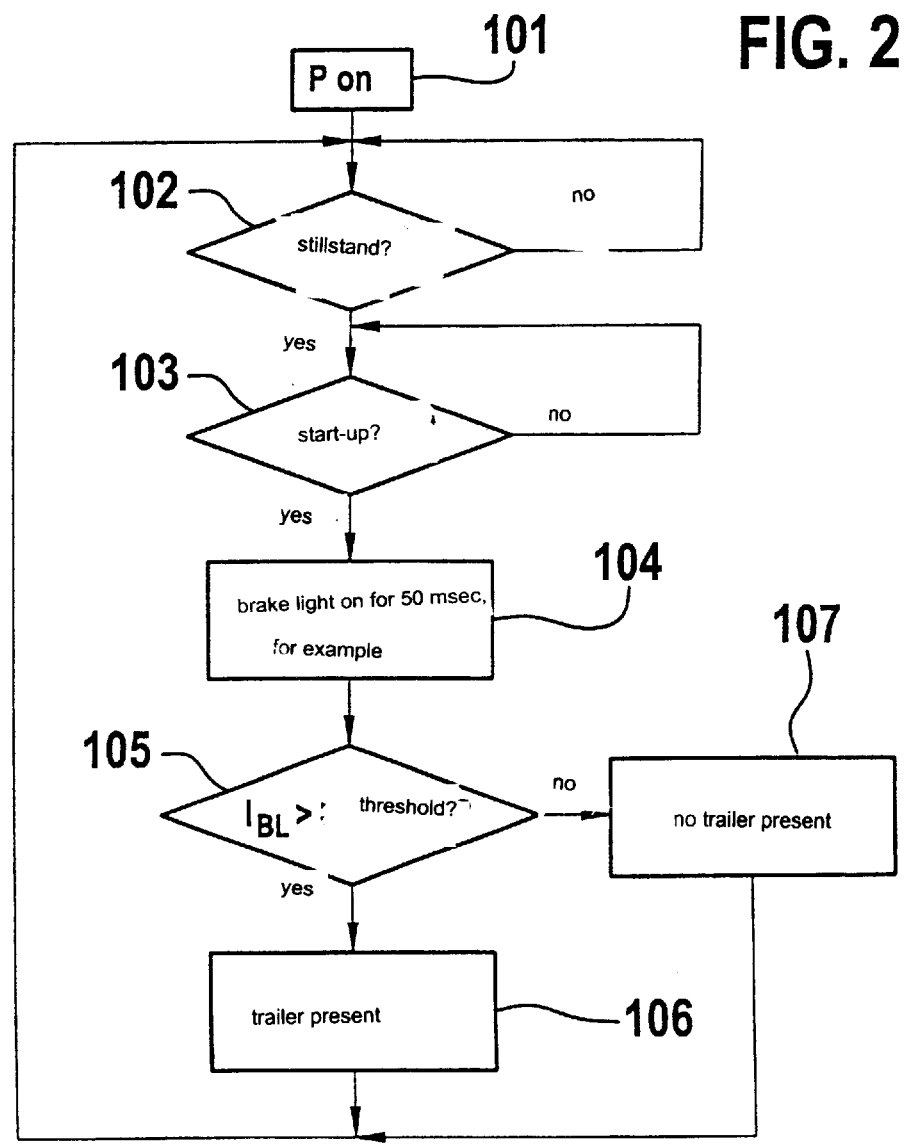
FIG. 2 shows a flow diagram illustrating the method according to the present invention.

The method according to the present invention for recognizing a trailer, using an activation of brake light 4 independent of the driver, is now explained in greater detail with the help of the flow diagram in FIG. 2. In this connection, control unit 1 is switched on in one step 101. Besides switching on the control unit, in this step the method according to the present invention is also started. A subsequent step 102 determines whether the vehicle is standing still. To recognize whether the vehicle is standing still, a check test is made to see whether the vehicle velocity is equal to zero or smaller than a threshold value that can be set. If this is the case, a subsequent step 103 check tests whether a starting procedure has occurred. If no stillstand is determined, step 102 is carried out again. A starting procedure exists when the vehicle speed for the first time exceeds a specific limiting speed. Consequently, a starting recognition is carried out as a function of the vehicle speed. In the case of a starting procedure, brake light 4 is lit, for example, for a time span of 50 msec, in a step 104. If no stillstand is determined, step 103 is carried out again. In step 105, the current flowing in cord 10b is measured by current measuring device 5, and the measured current $I_{BL}$ is compared to an appropriate threshold value. This comparison can be made, for instance, by control device 1. If the measured current $I_{BL}$ exceeds the threshold value, this represents clear information that a trailer is coupled to the vehicle. This is determined in step 106. This information can be conveyed to control unit 1 for consideration in its further control activity. On the other hand, this information can be indicated to the driver of the vehicle by a suitable indicator device not illustrated in detail. However, if current $I_{BL}$, determined in step 105, is smaller than the threshold value, the conclusion is reached that no trailer is present (step 107). This information also can be communicated to control unit 1 and/or to the driver of the vehicle. It should be noted that recognition of a trailer can also be carried out, for example, using a suitable voltage measurement in lead cord 10b, after lighting of brake light 4 has occurred independently from the driver. Following step 106 or 107 respectively, step 102 is performed again.

The described ascertainment as to whether a trailer or semitrailer is present was done, in the preceding, in connection with a startup procedure. Carrying out this ascertainment independently of a startup procedure is also possible. One might think, for instance, of making a cyclical run-through (in a predefined time base of a few seconds, for example) of the procedure for recognizing an attached trailer independently of a startup procedure.

Finally, it should be pointed out that, in addition to this, sensing the brake light current offers further advantages in the framework of an electronic stability program for utility vehicles, for example, in ascertaining an ABS startup in trailers or semitrailers with ABS systems having brake lights provided. Such an ABS system provided with brake lights is shown schematically in FIG. 1, marked with reference numeral 6. In this connection it should be noted that an ABS control unit is usually fed by the same circuit as the brake light. When the driver applies the brakes, a current flows through this circuit with a first magnitude which is predefined by the resistance of the brake light (it being assumed here that there is no ABS system). If such braking or such a situation occurs, in which the ABS control unit begins a regulation, a current with a second (higher) value flows through the circuit, since the ABS control unit also takes up current, and this current is also supplied by this circuit.

These circumstances, for example, can also be utilized with a view to rollover recognition. If a vehicle combination travels with a transverse acceleration in excess of a predetermined threshold value, there may be the danger of a rollover of the vehicle combination. Such threatening rollover danger becomes apparent first with the wheels inside the curve, since these threaten to lift off. Therefore, the following procedure is available for recognizing rollover: If the transverse acceleration (of the tow vehicle, for example) exceeds an assigned threshold value, a small brake pressure is applied at least at the wheels of the trailer or semitrailer on the inside of the curve. At great unloading of the wheels at the inside of the curve, the ABS system responds and carries out a regulation. This regulation expresses itself in a current taken up by the ABS control unit. That means, that a current flows through the circuit mentioned above, which can be detected using the current measuring device. Therefore, by a corresponding plausibility interrogation, using the current measuring unit provided in accordance with the present invention, rollover can be recognized at least of the trailer or semitrailer.

What is claimed is:

1. A method for recognizing one of a trailer and a semitrailer of a motor vehicle, comprising the steps of:

activating at least one brake light of the one of the trailer and the semitrailer, wherein the at least one brake light is not activated by the driver actuating the brake pedal so that activation of the at least one brake light is performed independently of a driver of the vehicle;

measuring a current flowing in a line assigned to the at least one brake light; and ascertaining one of a presence and an absence of the one of the trailer and the semitrailer as a function of the measured current;

wherein at least one of the following is satisfied:
   the activation of the brake light takes place over a predefined time interval; and
   the ascertaining step includes comparing the measured current with a threshold value, and the one of the presence and the absence of the one of the trailer and the semitrailer is ascertained as a function of the comparing.

2. The method according to claim 1, wherein the steps are performed during a start-up procedure of the vehicle.

3. The method according to claim 1, wherein the steps are performed cyclically.

4. The method according to claim 1, wherein the activation of the brake light takes place over the predefined time interval.

5. The method according to claim 4, wherein the predefined time interval is about 50 msec.

6. The method according to claim 1, wherein the ascertaining step includes the comparing of the measured current with the threshold value, and the one of the presence and the absence of the one of the trailer and the semitrailer is ascertained as a function of the comparing.

7. The method according to claim 1, further comprising the step of providing a signal representing the one of the presence and the absence of the one of the trailer and the semitrailer to at least one of (a) a control device of an electronic brake system and (b) the driver of the vehicle.

8. The method according to claim 1, wherein the predetermined time interval is selected so that operation of the brake light is not perceivable by another traffic participant.

9. The method according to claim 1, wherein the predetermined time interval is about 50 msec.

10. A device for recognizing one of a trailer and a semitrailer of a motor vehicle, comprising:
   means for activating at least one brake light of the one of the trailer and the semitrailer, wherein the at least one brake light is not activated by the driver actuating the brake pedal so that activation of the at least one brake light is performed independently of a driver of the vehicle;
   means for measuring a current flowing in a line assigned to the at least one brake light; and
   means for ascertaining one of a presence and an absence of the one of the trailer and the semitrailer as a function of the measured current;
   wherein at least one of the following is satisfied:
      the activation of the brake light takes place over a predefined time interval; and
      the ascertaining includes comparing the measured current with a threshold value, and the one of the presence and the absence of the one of the trailer and the semitrailer is ascertained as a function of the comparing.

11. A device for recognizing one of a trailer and a semitrailer of a motor vehicle, comprising:
   an activating arrangement to activate at least one brake light of the one of the trailer and the semitrailer, wherein the at least one brake light is not activated by the driver actuating the brake pedal so that activation of the at least one brake light is performed independently of a driver of the vehicle;
   a measuring arrangement to measure a current flowing in a line assigned to the at least one brake light; and
   an ascertaining arrangement to ascertain one of a presence and an absence of the one of the trailer and the semitrailer as a function of the measured current,
   wherein at least one of the following is satisfied:
      the activation of the brake light takes place over a predefined time interval; and
      the ascertaining arrangement is operable to compare a measured current with a threshold value, and the one of the presence and the absence of the one of the trailer and the semitrailer is ascertained as a function of the compare operation.

12. The device according to claim 11, wherein the device operates during a start-up procedure of the vehicle.

13. The device according to claim 11, wherein the activation of the brake light occurs over the predefined time interval.

14. The device according to claim 13, wherein the predefined time interval is about 50 msec.

15. The device according to claim 11, wherein the ascertaining arrangement is operable to compare the measured current with the threshold value, and the one of the presence and the absence of the one of the trailer and the semitrailer is ascertained as a function of the comparing.

16. The device according to claim 11, further comprising:
   an arrangement to provide a signal representing the one of the presence and the absence of the one of the trailer and the semitrailer to at least one of (a) a control device of an electronic brake system and (b) the driver of the vehicle.

17. The device according to claim 11, wherein the predetermined time interval is selected so that operation of the brake light is not perceivable by another traffic participant.

18. The device according to claim 11, wherein the predefined time interval is about 50 msec.

* * * * *